(12) United States Patent
Lucas et al.

(10) Patent No.: US 9,580,014 B2
(45) Date of Patent: Feb. 28, 2017

(54) SYSTEM, APPARATUS, AND METHOD OF DETECTING AND DISPLAYING OBSTACLES AND DATA ASSOCIATED WITH THE OBSTACLES

(71) Applicant: Convoy Technologies LLC, Indianapolis, IN (US)

(72) Inventors: Martin Lucas, Rancho Santa Margarita, CA (US); Blake Gasca, Aliso Viejo, CA (US); Edward Cheng, Hong Kong (CN); Daniel Rebelo, Newport Beach, CA (US); Christian Sullivan, Newport Beach, CA (US)

(73) Assignee: CONVOY TECHNOLOGIES LLC, Indianapolis, IN (US)

( * ) Notice: Subject to any disclaimer, the term of this patent is extended or adjusted under 35 U.S.C. 154(b) by 38 days.

(21) Appl. No.: 14/455,818

(22) Filed: Aug. 8, 2014

(65) Prior Publication Data
US 2015/0043782 A1 Feb. 12, 2015

Related U.S. Application Data

(60) Provisional application No. 61/863,830, filed on Aug. 8, 2013.

(51) Int. Cl.
*B60R 1/00* (2006.01)
*G06K 9/00* (2006.01)

(52) U.S. Cl.
CPC ........... *B60R 1/00* (2013.01); *G06K 9/00362* (2013.01); *G06K 9/00805* (2013.01); *B60R 2300/103* (2013.01); *B60R 2300/107* (2013.01); *B60R 2300/202* (2013.01); *B60R 2300/802* (2013.01); *G06K 9/00791* (2013.01)

(58) Field of Classification Search
None
See application file for complete search history.

(56) References Cited

U.S. PATENT DOCUMENTS

| | | | | |
|---|---|---|---|---|
| 4,967,276 A | * | 10/1990 | Murakami | H04N 5/265 250/330 |
| 5,001,558 A | * | 3/1991 | Burley | H04N 5/332 348/164 |
| 6,198,409 B1 | * | 3/2001 | Schofield | B60R 1/12 280/728.1 |

(Continued)

*Primary Examiner* — Utpal Shah
(74) *Attorney, Agent, or Firm* — Blakely Sokoloff Taylor & Zafman LLP

(57) ABSTRACT

A method of detecting and displaying the obstacles and data related to obstacles on a digital display starts with a detection processing unit receiving a digital video input signal from a first camera and depth data from a second camera. Digital input video input signal may include images of an area surrounding the vehicle. Digital video input signal may be analyzed to determine whether an obstacle is present in the area. When an obstacle is detected, the depth data may be analyzed to obtain a distance associated with the obstacle. Digital video output may be generated that includes the digital video input signal and a display of the distance associated with the obstacle. The display of the distance may be overlaid on the display of the obstacle. Digital video output may then be transmitted to the display device to be displayed to the user. Other embodiments are also described.

18 Claims, 4 Drawing Sheets

(56) References Cited

U.S. PATENT DOCUMENTS

| | | | | |
|---|---|---|---|---|
| 6,961,466 B2* | 11/2005 | Imagawa | G06K 9/00228 | 382/190 |
| 7,061,373 B2* | 6/2006 | Takahashi | G01S 13/931 | 340/435 |
| 7,139,411 B2* | 11/2006 | Fujimura | G06K 9/00362 | 250/330 |
| 7,199,366 B2* | 4/2007 | Hahn | G02B 23/12 | 250/330 |
| 7,486,803 B2* | 2/2009 | Camus | B60R 21/013 | 382/104 |
| 7,593,573 B2* | 9/2009 | Hahn | G06K 9/00791 | 250/332 |
| 7,680,592 B2* | 3/2010 | Ikeda | G02B 27/01 | 348/149 |
| 7,786,898 B2* | 8/2010 | Stein | B60R 1/00 | 340/436 |
| 7,974,445 B2* | 7/2011 | Nagaoka | B60R 1/00 | 340/903 |
| 8,018,354 B2* | 9/2011 | Yamamoto | B60K 37/02 | 340/435 |
| 8,164,432 B2* | 4/2012 | Broggi | G01S 17/023 | 340/425.5 |
| 8,504,233 B1* | 8/2013 | Ferguson | G06K 9/00798 | 340/463 |
| 2004/0178894 A1* | 9/2004 | Janssen | B60K 35/00 | 340/435 |
| 2009/0040306 A1* | 2/2009 | Foote | B60Q 1/2665 | 348/148 |
| 2011/0199198 A1* | 8/2011 | Yang | B60K 35/00 | 340/426.25 |
| 2012/0062743 A1* | 3/2012 | Lynam | B60Q 9/005 | 348/148 |
| 2012/0081544 A1* | 4/2012 | Wee | G01S 17/023 | 348/140 |
| 2013/0253754 A1* | 9/2013 | Ferguson | G05D 1/0231 | 701/28 |

\* cited by examiner

SYSTEM, APPARATUS, AND METHOD OF DETECTING AND DISPLAYING OBSTACLES AND DATA ASSOCIATED WITH THE OBSTACLES

CROSS-REFERENCE TO RELATED APPLICATIONS

This application claims the benefit of the U.S. Provisional Application No. 61/863,830, filed Aug. 8, 2013, the entire contents of which are incorporated herein by reference.

TECHNICAL FIELD

Embodiments of the invention relate generally to a system, apparatus and method of detecting and displaying obstacles and data associated with the obstacles on a digital display to a user.

BACKGROUND

Currently, there is a need to provide enhanced visual displays to drivers of commercial fleet vehicles. The areas around the vehicles that cannot be viewed from the driver's location ("blind spots") are estimated to be the cause of 60%-70% of accidents in both public and private commercial fleets.

The drivers often have a limited field of vision due to the size or the shape of the vehicles. For example, the rear view of vehicles such as garbage trucks is extremely limited. The driver cannot ensure that the sanitation employees working behind the truck are at a safe location and further, the driver cannot see, let alone, anticipate sudden obstacles that appear behind the truck.

SUMMARY

Generally, the invention relates to a system, apparatus, and method of detecting and displaying obstacles surrounding a vehicle and data related to the obstacles on a digital device to be viewed by a driver of the vehicle.

In one embodiment of the invention, a method of detecting obstacles surrounding a vehicle and displaying the obstacles and data related to the obstacles on a digital display inside the vehicle starts with a detection processing unit receiving a digital video input signal from a first camera and depth data from a second camera. The digital input video input signal may include images of an area surrounding the vehicle. In some embodiments the area includes at least the vehicle's blind spot. The digital video input signal may then be analyzed to determine whether at least one obstacle is present in the area surrounding the vehicle. When the at least one obstacle is detected, the depth data may then be analyzed to obtain a distance associated with the at least one obstacle. The distance may be the distance between the at least one obstacle and the vehicle. A digital video output may then be generated that includes the digital video input signal and a display of the distance associated with the at least one obstacle. The display of the distance may be overlaid on the display of the obstacle in the digital video input signal. The digital video output may then be transmitted to the display device to be displayed to the user. In some embodiments, the detection processing unit may also receive sensor data from a plurality of 3-Dimensional (3D) sensors and analyze the sensor data to further detect the presence of the at least one obstacle and obtain the distance associated with the at least one obstacle. In this embodiment, the detection processing unit may also calculate a time at which when the at least one obstacle will enter a blind spot of the vehicle.

In another embodiment, the system of detecting obstacles surrounding a vehicle and displaying the obstacles and data related to the obstacles, the system includes: an infrared (IR) light source to generate an infrared light, a first camera to generate a digital video input signal that includes images of an area surrounding the vehicle, a second camera to generate depth data, an detection processing unit and a digital display. The detection processing unit may be coupled to the first and second cameras and the digital display. The detection processing unit may include a communication interface to receive the digital video input signal from the first camera and the depth data from the second camera, a processor, and a storage device including instructions therein. When the instructions are executed by the processor, the processor may analyze the digital video input signal to determine whether at least one obstacle is present in the area surrounding the vehicle. When the at least one obstacle is detected, the processor may then analyze the depth data to obtain a distance associated with the at least one obstacle. The depth data generated by the second camera may be associated with the at least one obstacle and may be a video image of the infrared (IR) light on at least one obstacle in the area surrounding the vehicle. The processor may also then generate a digital video output including the digital video input signal and a display of the distance associated with the at least one obstacle overlaid on the obstacle in the digital video input signal. The digital video output may be transmitted to the digital device via the communication interface. In some embodiments, the processor may also generate and transmit an audio output to the digital device to provide an audible alert.

In another embodiment, an apparatus for detecting obstacles surrounding a vehicle and displaying the obstacles and data related to the obstacles may comprise: a processor, a communication interface coupled to the processor to receive a digital video input signal from a first camera and depth data from a second camera, and a storage device including instructions. When the instructions are executed by the processor, the processor may be caused to analyze the digital video input signal to determine whether at least one obstacle is present in the area surrounding the vehicle. When the at least one obstacle is detected, the processor may analyze the depth data to obtain a distance associated with the at least one obstacle. In one embodiment, the depth data generated by the second camera is associated with the at least one obstacle and is a video image of the infrared (IR) light on at least one obstacle in the area surrounding the vehicle. The processor may then generate a digital video output including the digital video input signal and a display of the distance associated with the at least one obstacle overlaid on the obstacle in the digital video input signal, and may transmit the digital video output to a digital device via the communication interface.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

Figure 1:
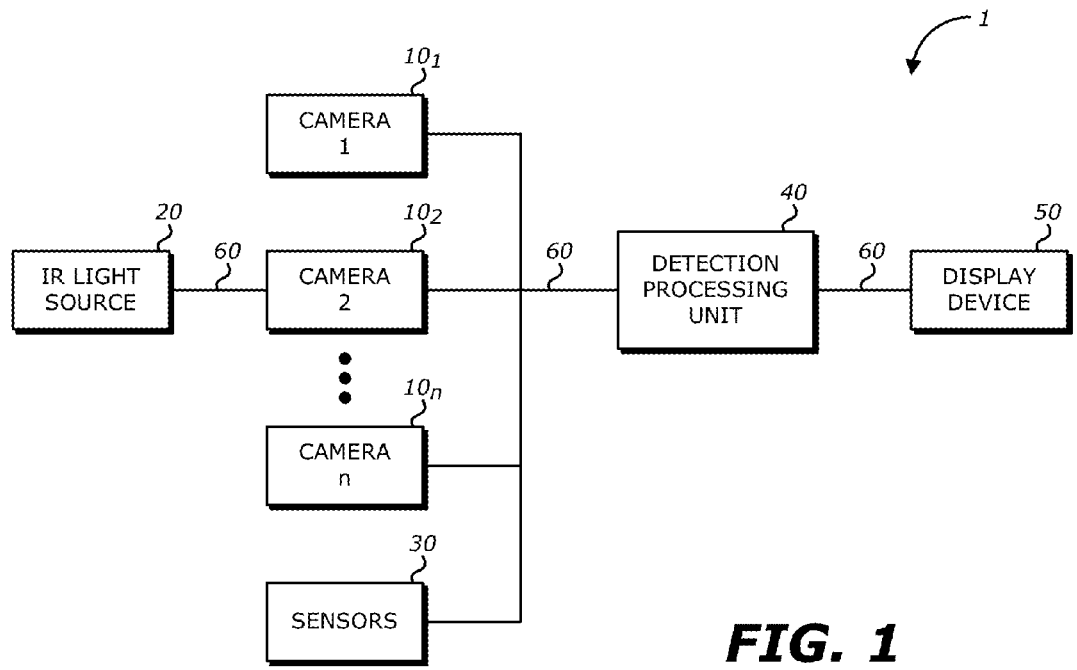
FIG. 1 illustrates a block diagram of a system for detecting and displaying obstacles and data associated with the obstacles according to an embodiment of the invention.

FIG. 1 illustrates a block diagram of a system 1 for detecting and displaying obstacles and data associated with the obstacles according to an embodiment of the invention. The system 1 includes a plurality of cameras $10_1$-$10_n$ (n>1), an infrared (IR) light source 20, sensors 30, a detection processing unit 40, and a display device 50.

The plurality of cameras $10_1$-$10_n$ (n>1) may include digital cameras such as CMOS cameras. In one embodiment, the cameras $10_1$-$10_n$ are mounted on the outside of a vehicle (e.g., cars, trucks, planes, marine crafts, etc.) and aimed such that the cameras $10_1$-$10_n$ may capture images in areas surrounding the vehicle. The desired areas to be captured by the cameras $10_1$-$10_n$ may include the vehicle's "blind spot" or other areas that are difficult to view from the driver's location and perspective. In one embodiment, the first camera $10_1$ captures digital images of one area surrounding the vehicle and generates a digital video input signal that includes images of that area.

The infrared (IR) light source 20 may also be mounted on the outside of the vehicle to generate an infrared light. As shown in FIG. 1, a second camera $10_2$ is coupled to the IR light source 20. The second camera 102 may be positioned such that the second camera $10_2$ captures digital images of the same area surrounding the vehicle as the first camera $10_1$. In addition, the second camera $10_2$ may also generate depth data. The depth data may be a video image of the infrared (IR) light from the IR light source 20 on obstacles detected in the area surrounding the vehicle.

The system 1 in FIG. 1 may also include sensors 30 that are mounted on the exterior of the vehicle. In some embodiments, the sensors 30 are included in at least one of the cameras $10_1$-$10_n$. The sensors 30 may be 3-Dimensional (3D) image sensors that generate sensor data by measuring the brightness of an image, the distance from the sensors 30 to given obstacles sensed by the sensors 30 as well as movement of the given obstacles.

Figure 2:
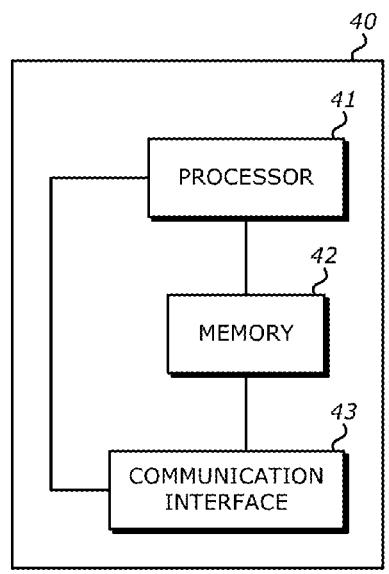
FIG. 2 illustrates the details of the detection processing unit according to one embodiment of the invention.

As shown in FIG. 1, the detection processing unit 40 may be coupled to the cameras $10_1$-$10_n$ to receive at least the digital video input signal and the depth data. The detection processing unit 40 may also be coupled to the sensors 30 to receive sensor data. FIG. 2 illustrates the details of the detection processing unit 40 according to one embodiment of the invention. The detection processing unit 40 may include a processor 41, memory device 42 and a communication interface 43.

The communication interface 43 is be a network communication interface that may include a wired network interface such as an IEEE 802.3 Ethernet interface as well as a wireless interface such as an IEEE 802.11 WiFi interface. Data may also be received from any one of a variety of different wireless communications networks and in accordance with any one of several different protocols. These include: a cellular mobile phone network (e.g. a Global System for Mobile communications, GSM, network), including current 2G, 3G, 4G, and LTE networks; and an IEEE 802.11 network (WiFi or Wireless Local Area Network, WLAN). The communication interface 43 may also include wireless connections may include Bluetooth™ connections. In one embodiment, the communication interface 43 receives the digital video input signal and the depth data from the first and second cameras $10_1$, $10_2$, respectively, via the communication links 60. Further, the communication interface 43 receives a digital video output from the processor 41 and transmits the digital video output to the digital device 50 via the communication link 60. The communication interface 43 may also allow the detection processing unit 40 to communicate with a network (not shown) to download any updates to the instructions to be stored in the memory device 42. Further, users via external computing devices may communicate with the detection processing unit 40 or even control the detection processing unit 40 remotely.

The processor 41 that is coupled to the communication interface 43 may include a microprocessor, a microcontroller, a digital signal processor, or a central processing unit, and other needed integrated circuits such as glue logic. The term "processor" may refer to a device having two or more processing units or elements, e.g. a CPU with multiple processing cores. The processor 41 may be used to control the operations of detection processing unit 40. For example, the processor 41 may be coupled to the communication interface 43 and executes software to control the wireless network communications functionality of detection processing unit 40 (e.g. communicating with a network (not shown) to download the updated instructions to be stored in the memory device 42, transmit and receive data to other components of system 1). In some cases, a particular function may be implemented as two or more pieces of software that are being executed by different hardware units of a processor.

In one embodiment, the processor 41 is coupled to the communication interface 43 and receives the digital video input signal and the depth data. The processor 41 may also receive sensor data from the sensors 30. Using at least one of the received digital video input signal, depth data, and sensor data, the processor 41 may perform the analysis of that data, as described below. For example, the data may be analyzed through an artificial intelligence process or in the other ways described herein.

In one embodiment, the processor 41 is also coupled to the memory device 42 that may include one or more different types of storage such as hard disk drive storage, nonvolatile memory, and volatile memory such as dynamic random access memory. The memory device 42 stores instructions (e.g. software; firmware) which may be executed by the processor 41. In one embodiment, when the instructions stored in memory device 42 are executed by the processor 41, the processor 41 may detect obstacles surrounding the vehicle and may cause the display of the obstacles and data related to the obstacles on the digital device 50, as discussed in further detail below.

In one embodiment, the processor 41 analyzes the digital video input signal to determine whether any obstacles are present in the area surrounding the vehicle. When an obstacle is detected, the processor 41 may analyze the depth data to obtain a distance between the vehicle and the obstacle. The processor 41 may also analyze the sensor data from the sensors 30 to determine the distance between the vehicle and the obstacle. Since the obstacles may be moving objects as well as non-moving objects, the sensor data (e.g., (i) distance between the vehicle and the obstacle, (ii) the detected movement of the obstacle, etc.) may also be used by the processor 41 to calculate a time at which when the obstacle will enter a blind spot of the vehicle. In one embodiment, the processor 41 may generate a digital video output including the digital video input signal having the display of the distance between the vehicle and the obstacle overlaid on the image of the obstacle. In other embodiments, the digital video output may also include the calculated time at which when the obstacle will enter the blind spot of the vehicle overlaid on the digital video input signal. In one embodiment, the processor 41 may also transmit an audio output to the digital device 60 that causes the audible alert to be generated. The audible alert may include a verbal warning or an alarm or beeping sound indicating that an obstacle is detected in the area around the vehicle. The verbal warning may include the type of obstacle detected (e.g., human being, animal, car, etc.) and the distance between the vehicle and the obstacle. The audio output may be transmitted to cause the audible alert to be generated based on the relevance of the obstacle detected. For instance, the audible alert may be generated if the obstacle is a human being or animal but may not be generated if the obstacle is a paper bag.

Accordingly, in one embodiment, the processor 41 determines determining a relevance of the obstacles detected based on at least one of: the sensor data, the depth data, and the digital video input signal. To determine the relevance of each detected obstacle, the processor 41 may compare factors associated with an image of the obstacle in the digital video input signal to known factors stored in a memory device 42 to identify the obstacle's type. For instance, an image recognition program may be used to assess the images in the digital video input signal by comparing a factor (such as the shape or size) of the obstacle in the digital video input signal to a known factor (such as the shape and size of a human, a car, a bike, a structure, etc.) to identify the type of obstacle in the digital video input signal. The processor 41 may also determine the relevance of each detected obstacle by comparing the distance associated with the obstacle with a threshold distance. The threshold distance may be predetermined and set as being the shortest acceptable distance from the vehicle. The processor 41 may also compare the time at which the obstacle will enter the blind spot with a threshold time. The threshold time may be predetermined and set as being the shortest acceptable time at which the obstacle will enter the blind spot. In this embodiment, when a plurality of obstacles is detected, the processor 41 may also generate a list prioritizing the plurality of obstacles based on at least one of: (i) the identification or the type of the obstacle (e.g., human, car, animal, structure, etc.), (ii) the distance associated with the obstacle, and (iii) the calculated time the obstacle will enter the blind spot.

Referring back to FIG. 1, the digital device 50 receives the digital video output from the detection processing unit 40 and displays the digital video output to the driver of the vehicle. The digital device 50 may be placed inside the vehicle within the field of view of the driver such that the driver may adequately assess the obstacles in around his vehicle and drive accordingly. The digital device 50 may be an electronic device that includes a display screen and has the communication interface to receive the outputs from the detection processing unit 40 (e.g., television, LCD screen, computer screen, mobile telephone, smartphone, tablet computer, laptop, etc.). As shown in FIG. 1, the detection processing unit 40 may be coupled to the plurality of cameras $10_1$-$10_n$, the infrared (IR) light source 20, sensors 30 and the display device 50 via a communication links 60 that may be wired or wireless connections.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 3:
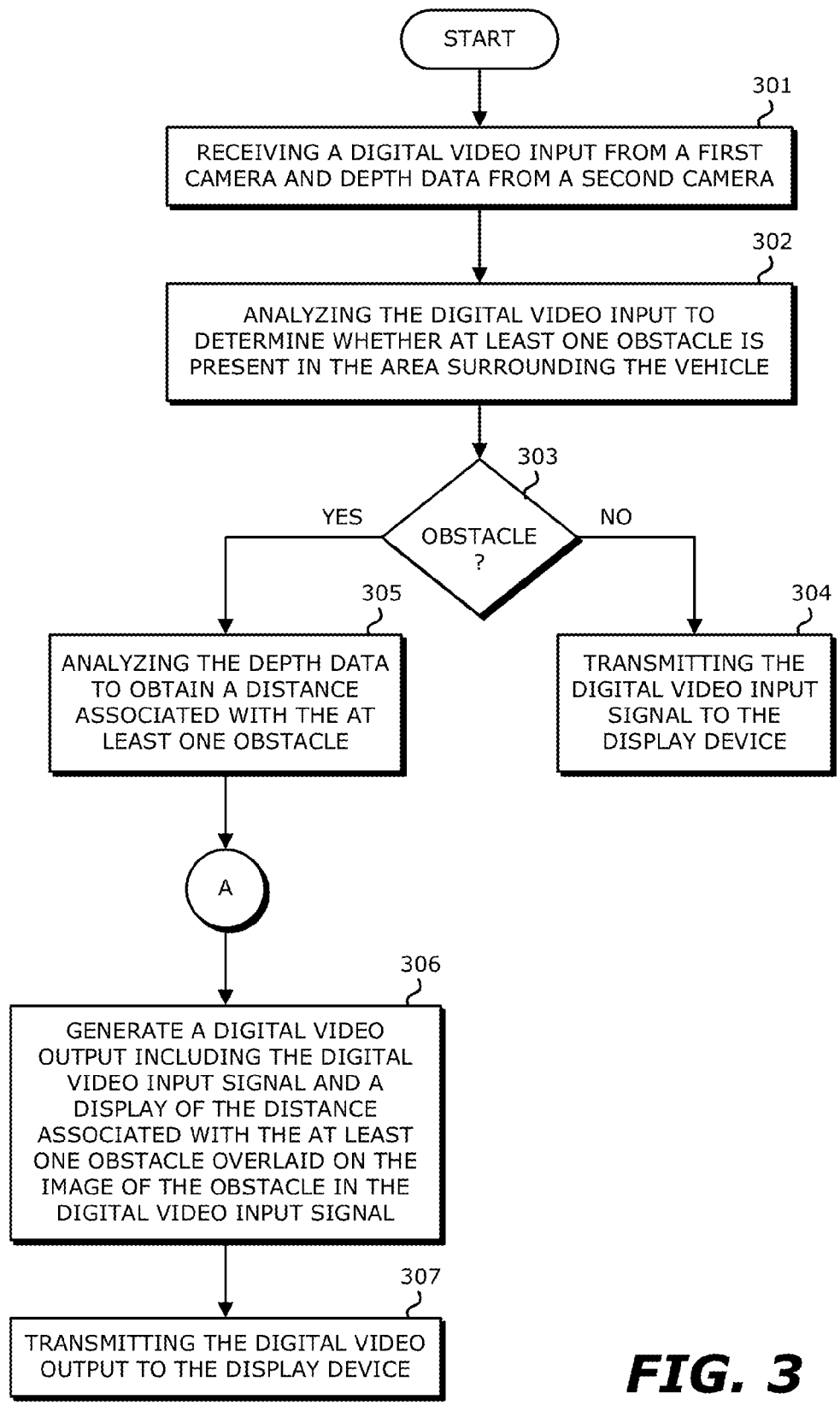
FIG. 3 illustrates a flow diagram of an example method of detecting and displaying obstacles according to an embodiment of the invention.

FIG. 3 illustrates a flow diagram of an example method 300 of detecting obstacles surrounding a vehicle and displaying the obstacles and data related to the obstacles on a digital display inside the vehicle according to an embodiment of the invention. Method 300 starts, at Block 301, with a detection processing unit receiving a digital video input signal from a first camera and depth data from a second camera. The digital input video input signal may include images of an area surrounding the vehicle. At Block 302, the digital video input signal is analyzed to determine whether at least one obstacle is present in the area surrounding the vehicle. The analysis of the digital video input signal may include using an image recognition program on the digital video input signal. The image recognition program may identify elements in the digital video input signal that are obstacles. In one embodiment, the image recognition program is an artificial intelligence program that adaptively learns to detect the obstacles such that the obstacle recognition is improved over time and false alarms are decreased over time. At Block 303, the detection processing unit determines whether at least one obstacle is present in the area surrounding the vehicle. If no obstacle is determined to be present in the area at Block 303, the detection processing unit 40 transmits the digital video input signal to the display device 50 to be displayed (Block 304). However, if at least one obstacle is determined to be present in the area at Block 303, the detection processing unit 40 analyzes the depth data to obtain a distance associated with the at least one obstacle (Block 305) and generates a digital video output (Block 306). The digital video output may include the digital video input signal and a display of the distance associated with the at least one obstacle overlaid on the image of the obstacle in the digital video input signal. At Block 307, the digital video output is transmitted from the detection processing unit 40 to the display device 50.

Figure 4:
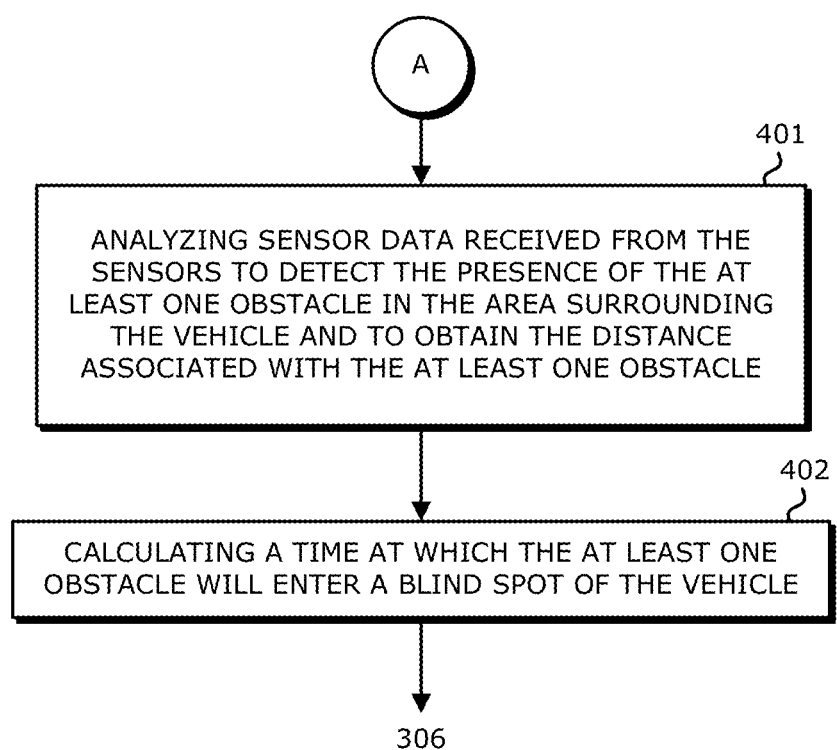
FIG. 4 illustrates a flow diagram of additional steps in an example method of detecting and displaying obstacles according to another embodiment of the invention.

FIG. 4 illustrates a flow diagram of additional steps in an example method of detecting and displaying obstacles according to another embodiment of the invention. In this embodiment, after Block 305 of FIG. 3, the detection processing unit 40 analyzes sensor data received from the sensors to detect the presence of the at least one obstacle in the area surrounding the vehicle and to obtain the distance associated with the at least one obstacle (Block 401). At Block 402, the detection processing unit 40 calculates a time at which the at least one obstacle will enter a blind spot of the vehicle. In this embodiment, at Block 306, the digital video output being generated includes a display of the calculated time at which the at least one obstacle will enter a blind spot of the vehicle. The display of the calculated time may be overlaid on a part of the digital video input signal.

Figure 5:
FIG. 5 illustrates an example of the displayed digital video output according to an embodiment of the invention may be implemented.

FIG. 5 illustrates an example of the displayed digital video output according to an embodiment of the invention may be implemented. As shown in FIG. 5, the digital device 50 displays the digital video input signal that include digital images of one area surrounding the vehicle as captured by the first camera 10₁. Here, the digital video input signal includes images of the rear of the vehicle (e.g., a garbage truck) that shows the sanitation employees at various locations. The digital video input signal also includes a display of the distances associated with each of the sanitation employees overlaid on their images. In one embodiment, the color of the display of the sanitation employee that is too close to the vehicle (e.g., exceeding an acceptable threshold distance) may be altered in order to provide a visual cue to the driver that the sanitation is a dangerous obstacle. For instance, the display of the sanitation employee that is too close to the vehicle may be changed to a red color.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method of detecting obstacles surrounding a vehicle and displaying the obstacles and data related to the obstacles on a digital display inside the vehicle, the method comprising:
   receiving by a processor of a detection processing unit a digital video input signal from a first camera and depth data from a second camera, wherein the digital input video input signal includes images of an area surrounding the vehicle;
   analyzing by the processor the digital video input signal to determine whether at least one obstacle is present in the area surrounding the vehicle; and
   when the at least one obstacle is detected,
      analyzing by the processor the depth data to obtain a distance associated with the at least one obstacle,
      generating by the processor a digital video output including the digital video input signal and a display of the distance associated with the at least one obstacle overlaid on the obstacle in the digital video input signal, and
      transmitting by the processor the digital video output to the display device, and when a plurality of obstacles is detected,
      generating by the processor a list prioritizing the plurality of obstacles based on at least one of:
         (i) an identification of the at least one obstacle,
         (ii) the distance associated with the at least one obstacle, and
         (iii) a calculated time the at least one obstacle will enter a blind spot.

2. The method of claim 1, wherein the at least one obstacle is a moving object or a non-moving object.

3. The method of claim 1, wherein analyzing the depth data to obtain the distance associated with the obstacle further comprises:
   capturing by the second camera a video image of infrared (IR) light on the at least one obstacle, wherein the infrared light is outputted from an IR light source mounted on the vehicle; and
   calculating by the processor a distance between the IR light source and the at least one obstacle based on the IR light captured.

4. The method of claim 1, further comprising:
   receiving by the processor sensor data from 3-Dimensional (3D) sensors;
   analyzing the sensor data to detect the presence of the at least one obstacle in the area surrounding the vehicle and to obtain the distance associated with the at least one obstacle.

5. The method of claim 4, further comprising:
   calculating by the processor the calculated time at which the at least one obstacle will enter the blind spot of the vehicle.

6. The method of claim 5, wherein the digital video output further includes a display of the calculated time.

7. The method of claim 6, further comprising:
   determining by the processor a relevance of the at least one obstacle based on at least one of the sensor data, the depth data, and the digital video input signal,
   wherein determining the relevance of the at least one obstacle includes by the processor performing at least one of:
      (i) comparing factors associated with an image of the at least one obstacle in the digital video input signal to known factors stored in a memory storage device to identify the at least one obstacle, (ii) comparing the distance associated with the at least one obstacle with a threshold distance, and
(iii) comparing the time at which when the at least one obstacle will enter the blind spot with a threshold time.

8. The method of claim 4, wherein the digital video input signal, the depth data, and the sensor data are received via a wired or a wireless connection.

9. The method of claim 1, wherein the digital video output is transmitted to the display device via a wired or a wireless connection.

10. The method of claim 1, further comprising, when the at least one obstacle is detected, transmitting an audio output to the digital device, the audio output provides an audible alert.

11. A system of detecting obstacles surrounding a vehicle and displaying the obstacles and data related to the obstacles, the system comprising:
   an infrared light source to generate an infrared light;
   a first camera to generate a digital video input signal that includes images of an area surrounding the vehicle;
   a second camera to generate depth data,
   a detection processing unit coupled to the first and second cameras, the object detection processing unit including:
      a processor,
      a storage device including instructions which, when executed by the processor, causes the processor to:
      analyze the digital video input signal to determine whether at least one obstacle is present in the area surrounding the vehicle,
      when the at least one obstacle is detected,
         (i) analyze the depth data to obtain a distance associated with the at least one obstacle, wherein the depth data generated by the second camera is associated with the at least one obstacle in the area surrounding the vehicle, wherein the depth data is a video image of the infrared (IR) light on at least one obstacle in the area surrounding the vehicle, and
         (ii) generate a digital video output including the digital video input signal and a display of the distance associated with the at least one obstacle overlaid on the obstacle in the digital video input signal, and
      when a plurality of obstacles is detected, a list prioritizing the plurality of obstacles based on at least one of:
         (i) an identification of the at least one obstacle,
         (ii) the distance associated with the at least one obstacle, and
         (iii) a calculated time the at least one obstacle will enter a blind spot, and
   a communication interface to
      (i) receive the digital video input signal from the first camera and the depth data from the second camera, and
      (ii) transmit the digital video output; and
   a digital display to display the digital video output received from the communication interface of the detection processing unit.

12. The system of claim 11, further comprising:
   a plurality of 3D sensors to generate sensor data, wherein the processor analyzes the sensor data to detect the presence of the at least one obstacle in the area surrounding the vehicle.

13. An apparatus for detecting obstacles surrounding a vehicle and displaying the obstacles and data related to the obstacles, the apparatus comprising:
   a processor,
   a communication interface coupled to the processor to receive a digital video input signal from a first camera and depth data from a second camera; and
   a storage device including instructions which, when executed by the processor, causes the processor to:
      analyze the digital video input signal to determine whether at least one obstacle is present in the area surrounding the vehicle,
      when the at least one obstacle is detected,
         (i) analyze the depth data to obtain a distance associated with the at least one obstacle, wherein the depth data generated by the second camera is associated with the at least one obstacle in the area surrounding the vehicle, wherein the depth data is a video image of the infrared (IR) light on at least one obstacle in the area surrounding the vehicle, and
         (ii) generate a digital video output including the digital video input signal and a display of the distance associated with the at least one obstacle overlaid on the obstacle in the digital video input signal, and
         (iii) transmit the digital video output to a digital device via the communication interface,
      when a plurality of obstacles is detected, a list prioritizing the plurality of obstacles based on at least one of:
         (i) an identification of the at least one obstacle,
         (ii) the distance associated with the at least one obstacle, and
         (iii) a calculated time the at least one obstacle will enter a blind spot.

14. The apparatus of claim 13, wherein analyzing the depth data to obtain the distance associated with the obstacle further comprises the processor
   to signal to the second camera to capture a video image of infrared (IR) light on the at least one obstacle, wherein the infrared light is outputted from an IR light source mounted on the vehicle; and
   to calculate a distance between the IR light source and the at least one obstacle based on the IR light captured.

15. The apparatus of claim 13, wherein the instructions, when executed by the processor, further causes the processor to:
   receive sensor data from 3-Dimensional (3D) sensors; and
   analyze the sensor data to detect the presence of the at least one obstacle in the area surrounding the vehicle and to obtain the distance associated with the at least one obstacle.

16. The apparatus of claim 13, wherein the instructions, when executed by the processor, further causes the processor to:
   calculate the calculated time at which the at least one obstacle will enter the blind spot of the vehicle.

17. The apparatus of claim 16, wherein the digital video output further includes a display of the calculated time.

18. The method of claim 17, wherein the instructions, when executed by the processor, further causes the processor to:
   determine a relevance of the at least one obstacle based on at least one of the sensor data, the depth data, and the digital video input signal, wherein determining the relevance of the at least one obstacle includes at least one of:
- (iv) comparing factors associated with an image of the at least one obstacle in the digital video input signal to known factors stored in a memory storage device to identify the at least one obstacle,
- (v) comparing the distance associated with the at least one obstacle with a threshold distance, and
- (vi) comparing the time at which when the at least one obstacle will enter the blind spot with a threshold time.

\* \* \* \* \*